United States Patent
Bresciani

(10) Patent No.: US 12,479,023 B2
(45) Date of Patent: Nov. 25, 2025

(54) METHOD FOR MANUFACTURING A DIE-CASTING MACHINE AND DIE-CASTING MACHINE

(71) Applicant: ITALPRESSEGAUSS S.P.A., Capriano del Colle (IT)

(72) Inventor: Michele Bresciani, Capriano del Colle (IT)

(73) Assignee: ItalPresseGauss S.p.A, Capriano del Colle (IT)

( * ) Notice: Subject to any disclaimer, the term of this patent is extended or adjusted under 35 U.S.C. 154(b) by 0 days.

(21) Appl. No.: 18/549,092

(22) PCT Filed: Mar. 9, 2022

(86) PCT No.: PCT/IB2022/052090
§ 371 (c)(1),
(2) Date: Sep. 5, 2023

(87) PCT Pub. No.: WO2022/189991
PCT Pub. Date: Sep. 15, 2022

(65) Prior Publication Data
US 2024/0149335 A1 May 9, 2024

(30) Foreign Application Priority Data
Mar. 9, 2021 (IT) .................. 102021000005498

(51) Int. Cl.
*B22D 17/26* (2006.01)
*B21H 3/04* (2006.01)
*B23G 1/02* (2006.01)

(52) U.S. Cl.
CPC ............ *B22D 17/263* (2013.01); *B21H 3/04* (2013.01); *B23G 1/02* (2013.01); *B23G 2210/28* (2013.01)

(58) Field of Classification Search
CPC ........ B22D 17/26; B22D 17/263; B21H 3/04; B23G 1/02
USPC .......................................... 164/303
See application file for complete search history.

(56) References Cited

U.S. PATENT DOCUMENTS

| | | | | |
|---|---|---|---|---|
| 4,948,358 | A | * | 8/1990 | Kushibe et al. .... B29C 45/6728 425/589 |
| 5,066,217 | A | * | 11/1991 | Fukuzawa et al. ......................... B29C 45/6707 425/451.7 |
| 2007/0286694 | A1 | | 12/2007 | Glimpel et al. |
| 2013/0307190 | A1 | | 11/2013 | Nagatomi |

FOREIGN PATENT DOCUMENTS

| | | |
|---|---|---|
| GB | 1537133 A | 12/1978 |
| JP | H052913 U | 1/1993 |
| JP | H08267523 A | 10/1996 |
| JP | H10315051 A | 12/1998 |

(Continued)

OTHER PUBLICATIONS

International Search Report for International Patent Application No. PCT/IB2022/052090, mailed Aug. 11, 2022.

(Continued)

*Primary Examiner* — Kevin P Kerns
(74) *Attorney, Agent, or Firm* — Armstrong Teasdale LLP

(57) ABSTRACT

In a die-casting machine with toggle-joint or without toggle-joint, a threaded section or a shaped section of horizontal columns is made by first carrying out turning and then rolling.

7 Claims, 7 Drawing Sheets

(56) References Cited

FOREIGN PATENT DOCUMENTS

| JP | 2005177789 A | 7/2005 |
|----|--------------|--------|
| JP | 2006321181 A | 11/2006 |

OTHER PUBLICATIONS

Italian Search Report for Italian Patent Application IT 202100005498, mailed Nov. 22, 2021.
Nakatsuka Y., Clamp apparatus for die cast and resin molding machines, has pair of half nuts screwed together to threaded portion of tie bar which penetrates fixed platen and deflection cam shaft for opening and closing half nut, WPI / 2017, Clarivate Analytics, Jul. 7, 2005, vol. 2005, No. 51, XP002804814.

\* cited by examiner

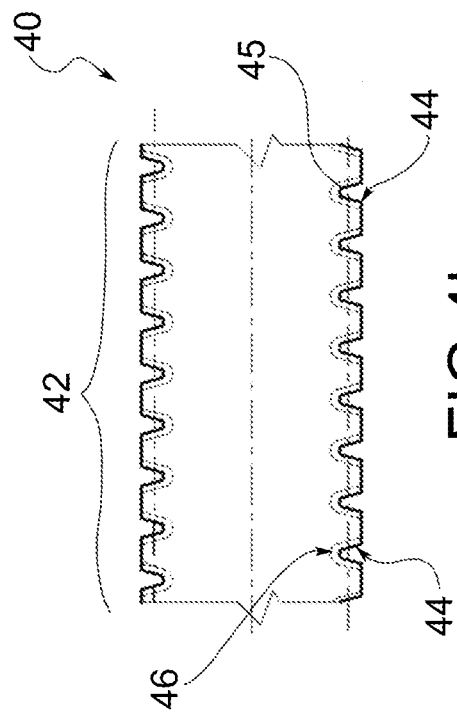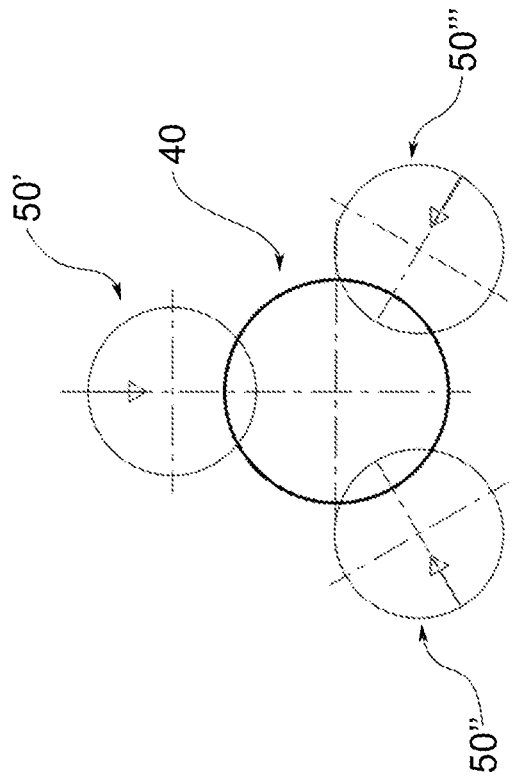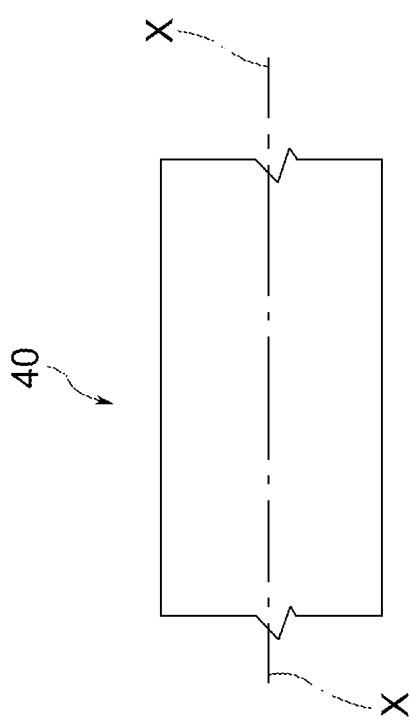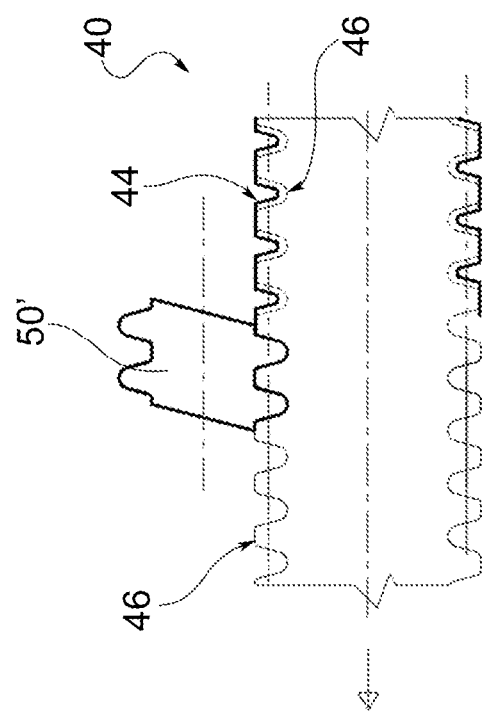
FIG.4a
FIG.4b
FIG.4c
FIG.4d

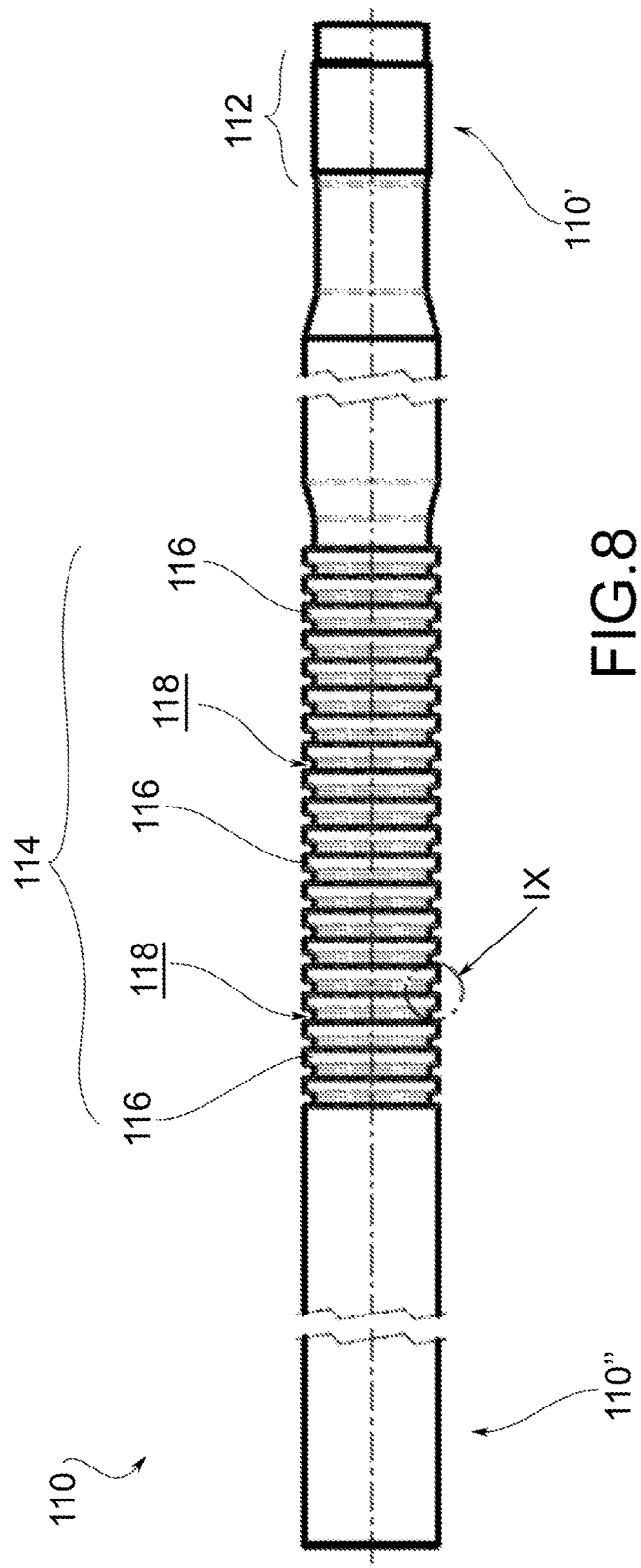
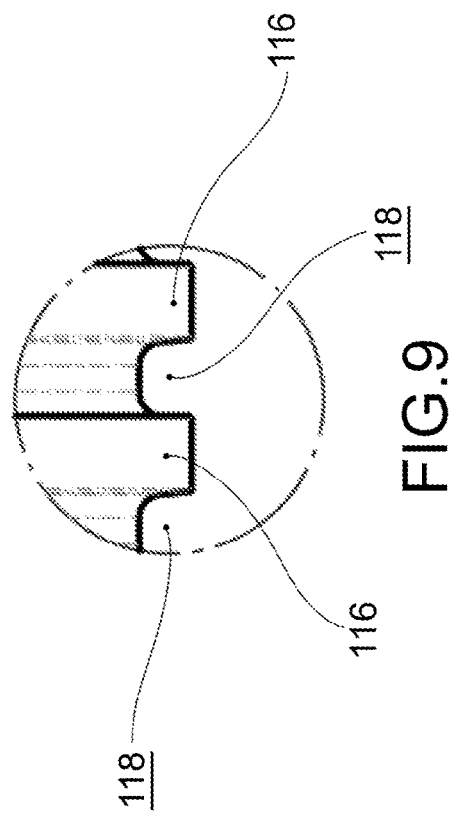
FIG.8
FIG.9

US 12,479,023 B2

METHOD FOR MANUFACTURING A DIE-CASTING MACHINE AND DIE-CASTING MACHINE

CROSS-REFERENCE TO RELATED APPLICATION

This application is a National Stage Application of International Patent Application No. PCT/IB2022/052090, having an International Filing Date of Mar. 9, 2022, which claims priority to Italian Application No. 102021000005498, filed Mar. 9, 2021, the entire contents of which are incorporated by reference herein.

FIELD OF THE INVENTION

The present invention relates to the field of die-casting machines, in particular for the die-casting of aluminum alloys and other metals, of the type without toggle-joint or with toggle-joint. In particular, the present invention relates to an innovative method for manufacturing the thread or the grooves of the horizontal columns of the machine and to a die-casting machine provided with said columns.

BACKGROUND OF THE INVENTION

According to the solutions known to date, a die-casting machine comprises a base having a predefined longitudinal extension, on which a first fixed vertical surface and a second fixed vertical surface, longitudinally spaced apart from the first, are mounted. Furthermore, the machine has a movable vertical surface placed between the fixed surfaces, which are longitudinally movable.

The two fixed vertical surfaces are rigidly connected by horizontal columns and the movable surface is guided on the base and slidingly supported along the horizontal columns.

The first fixed surface carries a first half-mold (which is therefore a fixed half-mold) and the movable surface carries a second half-mold (movable half-mold); the half-molds consist of two complementary parts which together define an impression of the piece to be obtained by die-casting.

The machine further comprises an injection unit for the delivery of molten metal into the mold when the two half-molds are coupled; the injection unit is supported by the base and placed in front of an external face of the first fixed surface.

The displacement and locking of the movable plane with the first fixed surface are usually carried out using two technologies: the first involves the use of a hydraulic cylinder for the displacement and a toggle-joint system for locking (machines with toggle-joint); the second contemplates the use of a hydraulic cylinder for the displacement and locking jaws which close on the columns, arranged behind the movable surface, for locking (machines without toggle-joint).

In machines with toggle-joint, the horizontal columns are threaded at both ends to fix them rigidly on one side to the first fixed surface and on the other to the second fixed surface.

In machines without toggle-joint, the horizontal columns are threaded on one side to connect them rigidly to the first fixed surface and in the central part they have a plurality of circumferential grooves, on which the locking jaws are engaged.

The implementation of the aforementioned threads or of the aforementioned cylindrical grooves is of enormous importance for the reliability of the die-casting machine, since the columns, during the normal operation of the machine, are stressed in traction with very intense fatigue cycles and high concentrations of traction stresses at the base of the thread or grooves, as well as high concentrations of compressive stresses in the contact areas between the column thread and that of the relative nut or between the column ribs and those of the relative jaw.

SUMMARY OF INVENTION

The object of the present invention is to identify an innovative method for manufacturing the thread or the circumferential grooves of the horizontal columns of die-casting machines, such as to improve the reliability of the machines.

Such object is achieved by a method as described and claimed herein. Advantageous embodiments of the present invention are also described.

BRIEF DESCRIPTION OF THE DRAWINGS

The features and the advantages of the method according to the present invention will appear more clearly from the following description, made by way of an indicative and non-limiting example with reference to the drawings of the accompanying figures, in which:

FIGS. 4a, 4b and 4c schematically show the method of manufacturing the column, according to an embodiment of the present invention;

FIG. 4d schematically shows a rolling process;

FIG. 8 shows a horizontal column of the machine of FIG. 7;

FIG. 9 is an enlargement of detail IX of FIG. 8, which highlights a shaped section of the column.

DETAILED DESCRIPTION OF THE INVENTION

Figure 1:
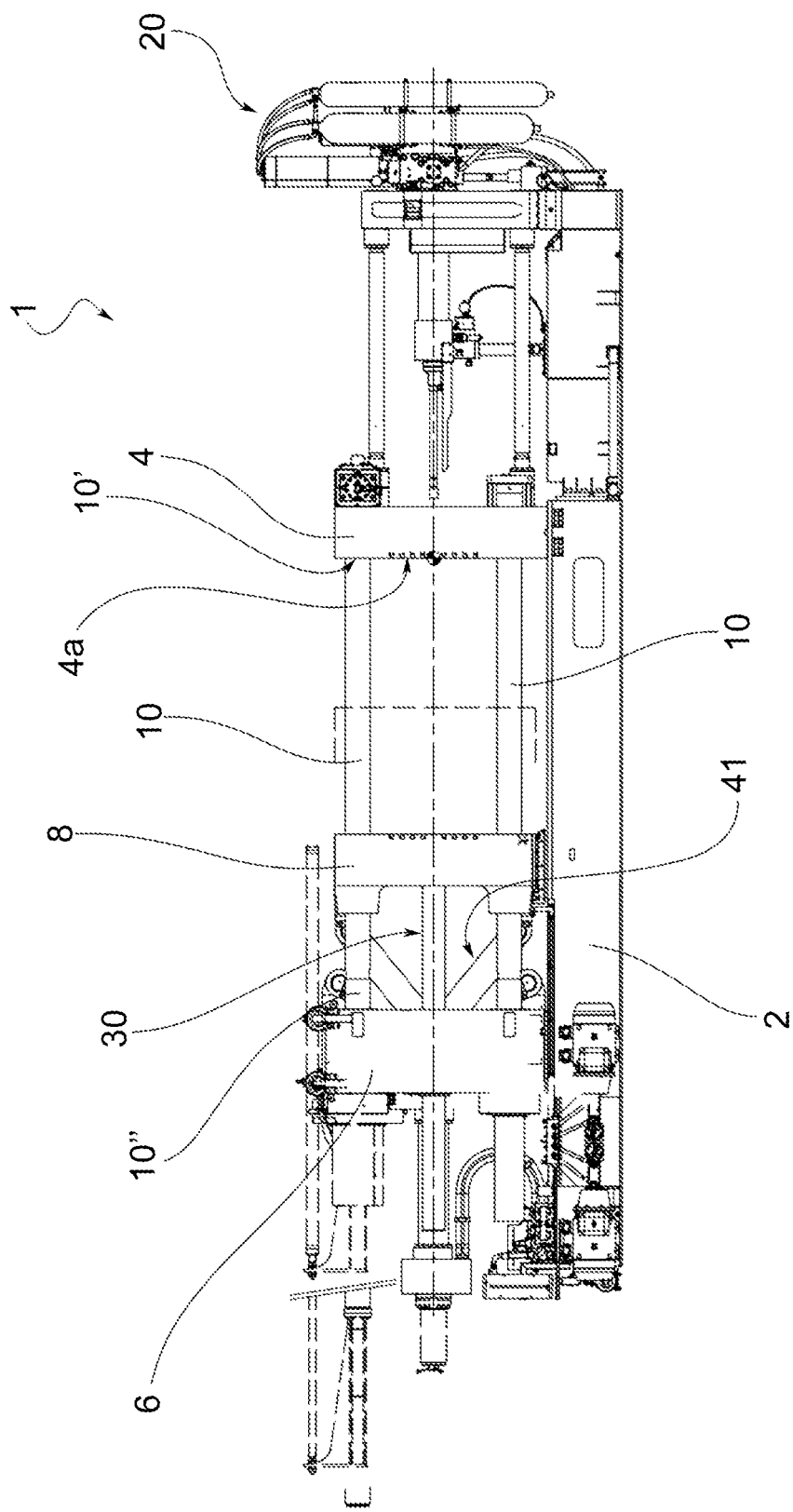
FIG. 1 shows a die-casting machine with toggle-joint, according to an embodiment of the present invention.
Figure 2:
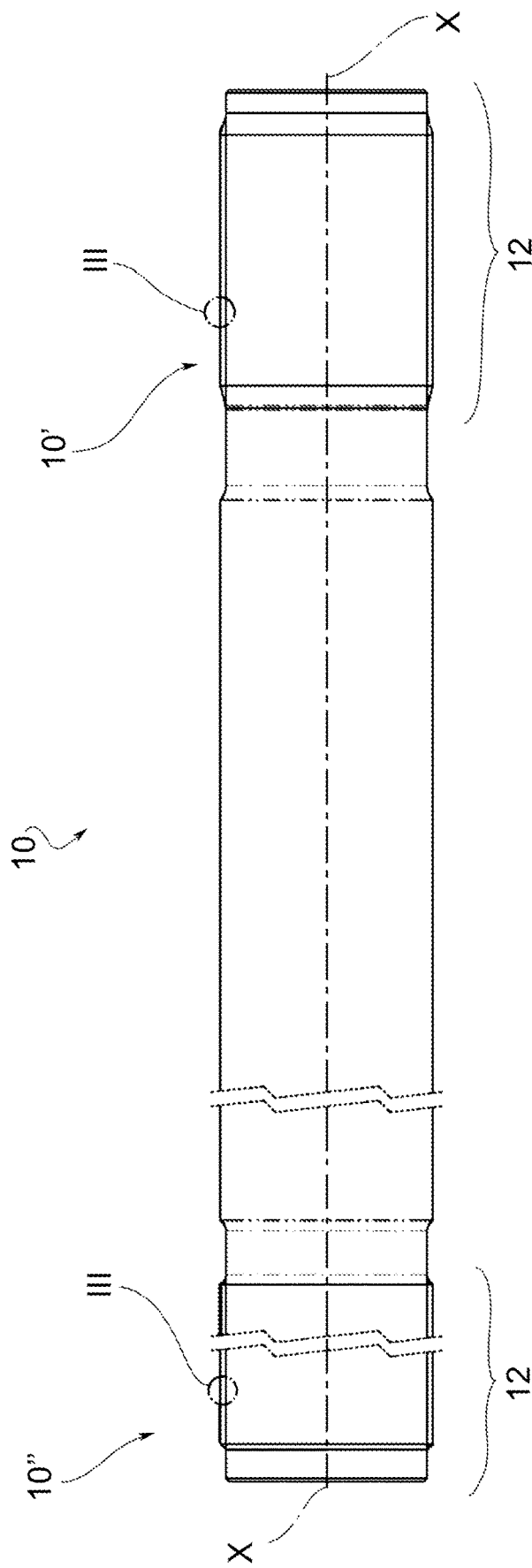
FIG. 2 shows a horizontal column of the machine of FIG. 1.
Figure 3:
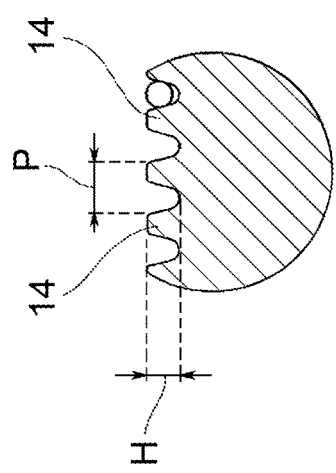
FIG. 3 is a sectional view of the detail III of FIG. 2, which highlights the shape of a thread.

With reference to FIG. 1, a die-casting machine with toggle joint 41 according to the present invention comprises a base 2 which extends longitudinally, a first fixed vertical surface 4, a second fixed vertical surface 6 longitudinally spaced apart from the first fixed surface 4, and a vertical movable surface 8, placed between the fixed surfaces 4, 6 and movable horizontally on command.

Preferably, the position of said second fixed surface is adjustable as a function of the height of the mold.

The two fixed surfaces 4, 6 are rigidly joined by horizontal columns 10, generally in a single piece of steel, which extend longitudinally; the movable surface 8 is guided on the base 2 and supported slidingly by the horizontal columns 10 to perform a longitudinal movement from and towards the first fixed surface 4.

An internal face 4a of the first fixed surface 4 carries a first half-mold (or half-fixed mold); an inner face 8a of the movable surface 8, facing the inner face 4a of the first fixed surface 4, carries a movable half-mold. The two half-molds consist of complementary parts which, when coupled together, form a mold impression, corresponding to the shape of the piece to be obtained by die-casting.

The machine 1 further comprises an injection unit 20 for delivering molten metal into the mold cavity when this is closed.

The machine 1 further comprises at least one hydraulic cylinder 30, for example arranged so as to cross the second fixed surface 6, connected to the movable surface 8 to move it longitudinally, and a toggle-joint system 41, for example arranged between the second fixed surface 6 and the movable surface 8, for locking the movable surface 8 in the position of engagement with the first fixed surface 4, in which the mold is closed.

Each horizontal column 10 extends longitudinally along a respective column axis X between a first end 10', fixed to the first fixed surface 4, and a second end 10", fixed to the second fixed surface 6. At said first 10' and second 10" ends, the horizontal column 10 has a respective threaded section 12 comprising a thread 14 characterized by a predefined pitch P and a depth H.

Figure 5:
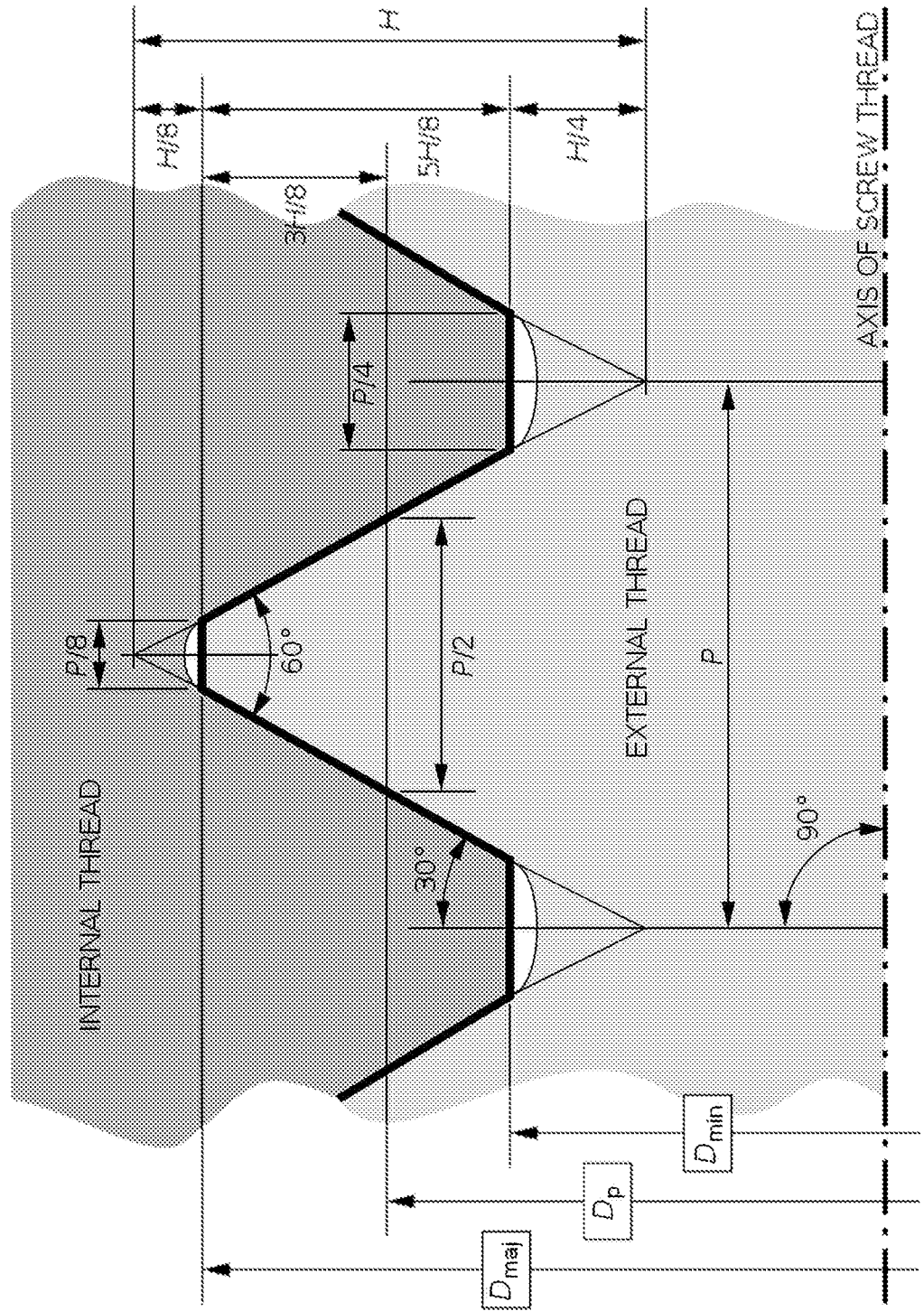
FIGS. 5 and 6 schematically show the standard profiles of a triangular and trapezoidal metric thread.
Figure 6:
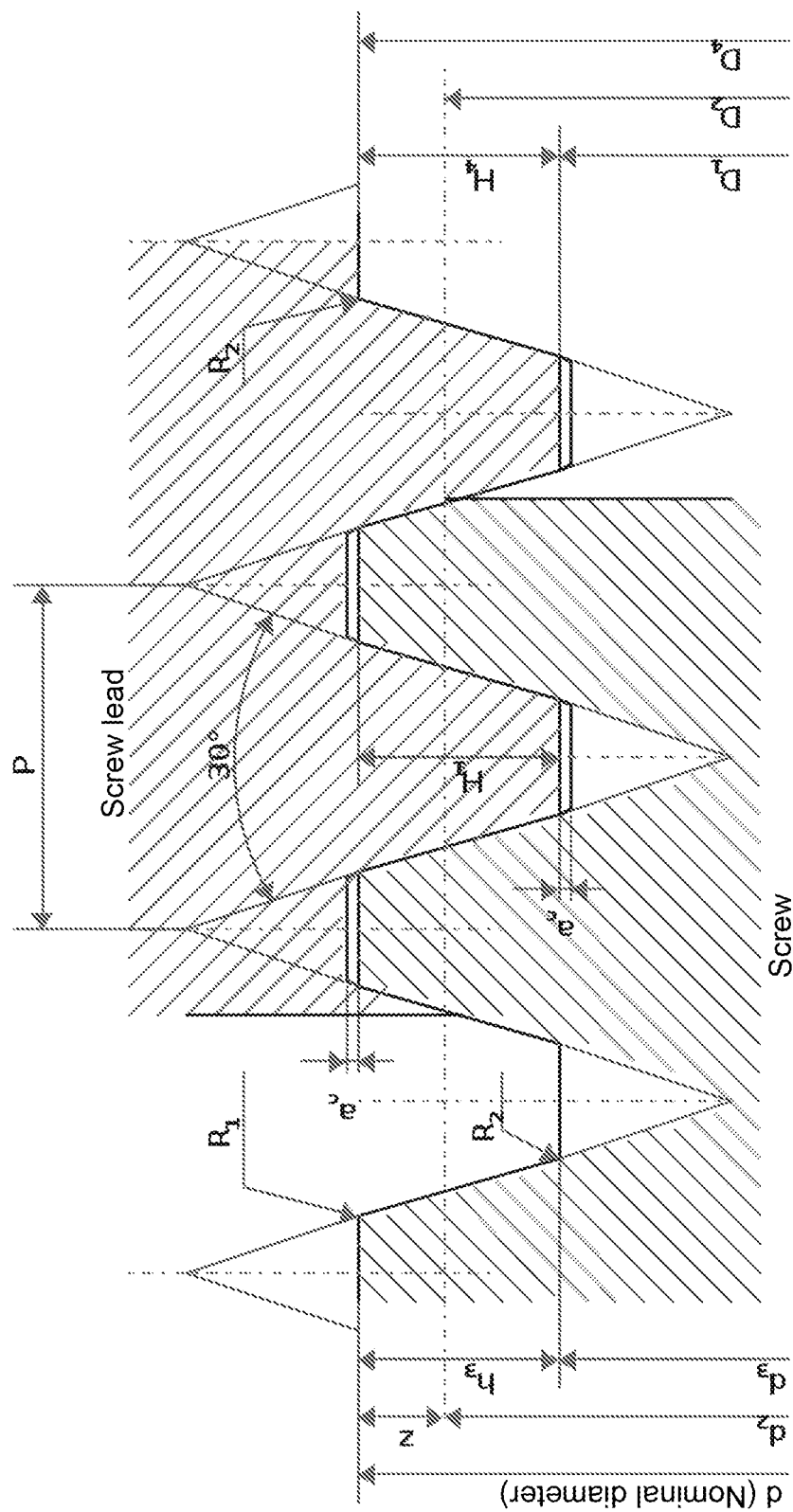

The fundamental dimensions of the thread, and in particular the depth H, are defined as a function of the pitch P, for example, in the case of a triangular metric thread, by the ISO 261 standard, "General purpose metric screw threads—General plan" (FIG. 5) or, in the case of trapezoidal threading, by the UNI ISO 2901÷2904 standard (FIG. 6).

Preferably, the thread 14 of the columns 10 takes up the correspondence between pitch P and depth H from the standard, but has variations in the profile, for example in the shape of the bottom of the groove.

According to the invention, the thread 14 of the horizontal column 10 is obtained by means of a turning process which leads to the creation of a preliminary profile and a subsequent rolling process carried out on the preliminary profile, which leads to the creation of a final profile.

In other words, starting from a semi-finished cylinder 40, having a smooth surface (FIG. 4*a*), a turning operation is carried out on a section to be threaded 42, i.e. a mechanical chip removal processing, which leads to the creation of a preliminary profile 44 having a stock 45 with respect to a final profile 46 which is to be obtained, at least at the grooves of the thread (FIG. 4*b*).

For example, the stock preferably has a thickness of 0.5-4 millimeters, preferably of 1.8-3.5 millimeters, more preferably of 2-3 millimeters.

Subsequently, a rolling process is carried out on the preliminary profile, or at least on a portion thereof corresponding to the grooves of the thread, i.e. a mechanical processing by plastic deformation, hot or cold (i.e. with heating or not of the product to be processed), which leads to the creation of the final profile 46 (FIG. 4*c*), by virtue of the plastic deformation of the stock.

The rolling carried out on a stock having the above dimensions allows a work hardening of the material to be obtained, and therefore greater resistance to fatigue, and at the same time allows the thread to be brought to the nominal dimensions. In the field of machines for processing plastic material, on the other hand, a finishing rolling is carried out on a stock of a few tenths of a millimeter only on a part of the thread, the remaining part already substantially having the nominal dimensions, and without carrying out any work hardening of the material.

For example, the rolling processing is carried out by means of rollers 50', 50", 50'", typically opposite or arranged with the rotation axes placed at the vertices of an equilateral triangle (FIG. 4*d*).

Advantageously, this method allows very reliable threads to be obtained, since the bottom of the grooves, obtained by plastic deformation of the stock left by the turning process, has a residual compressive stress state which considerably increases the fatigue resistance of the components.

In other words, the rolling is carried out both on the sides and on the grooves of the thread, to bring all the thread to the nominal size. In similar processes performed for the construction of plastic processing machines, a finishing rolling is carried out only on the bottom of the groove, on a stock of a few tenths of a millimeter.

Advantageously, moreover, this method allows operating by rolling to obtain the final profile even when the thread pitch, and therefore the depth of the grooves, is considerable, for example equal to or greater than 10 millimeters, since the first turning process allows part of the material to be removed and to then operate by rolling only on the stock. Otherwise, it would be technologically impossible to operate by rolling directly on the initial semi-finished cylinder, due to the very high actions required to obtain the plastic deformation.

In particular, the Applicant has found that it is possible to operate by complete rolling (i.e., without preliminary turning) only to obtain threads with a maximum depth of 5 or 6 millimeters; in the case of greater depths, the necessary forces that come into play are so high that they make complete rolling processing impractical.

Using the method according to the invention, however, it is possible to obtain threads with depths greater than 6 millimeters (for example, on columns with a diameter of 200 millimeters), as the turning eliminates part of the material and leaves a stock on which to effectively carry out the rolling.

For example, in an experimental test, applying the method according to the invention on an initial semi-finished cylinder with a diameter of 230 mm in 39NiCrMo4 steel, a trapezoidal thread with pitch P=16 mm was obtained by rolling, after a first turning which left a stock of 1.6 millimeters; the tests have shown that this thread has mechanical features equal to or better than those of a trapezoidal thread with pitch P=8 millimeters obtained by complete rolling.

In other words, the method according to the invention is preferably applied to the production of columns having a pitch p=14 millimeters or greater, since for smaller pitches it is possible to operate by rolling only.

Figure 7:
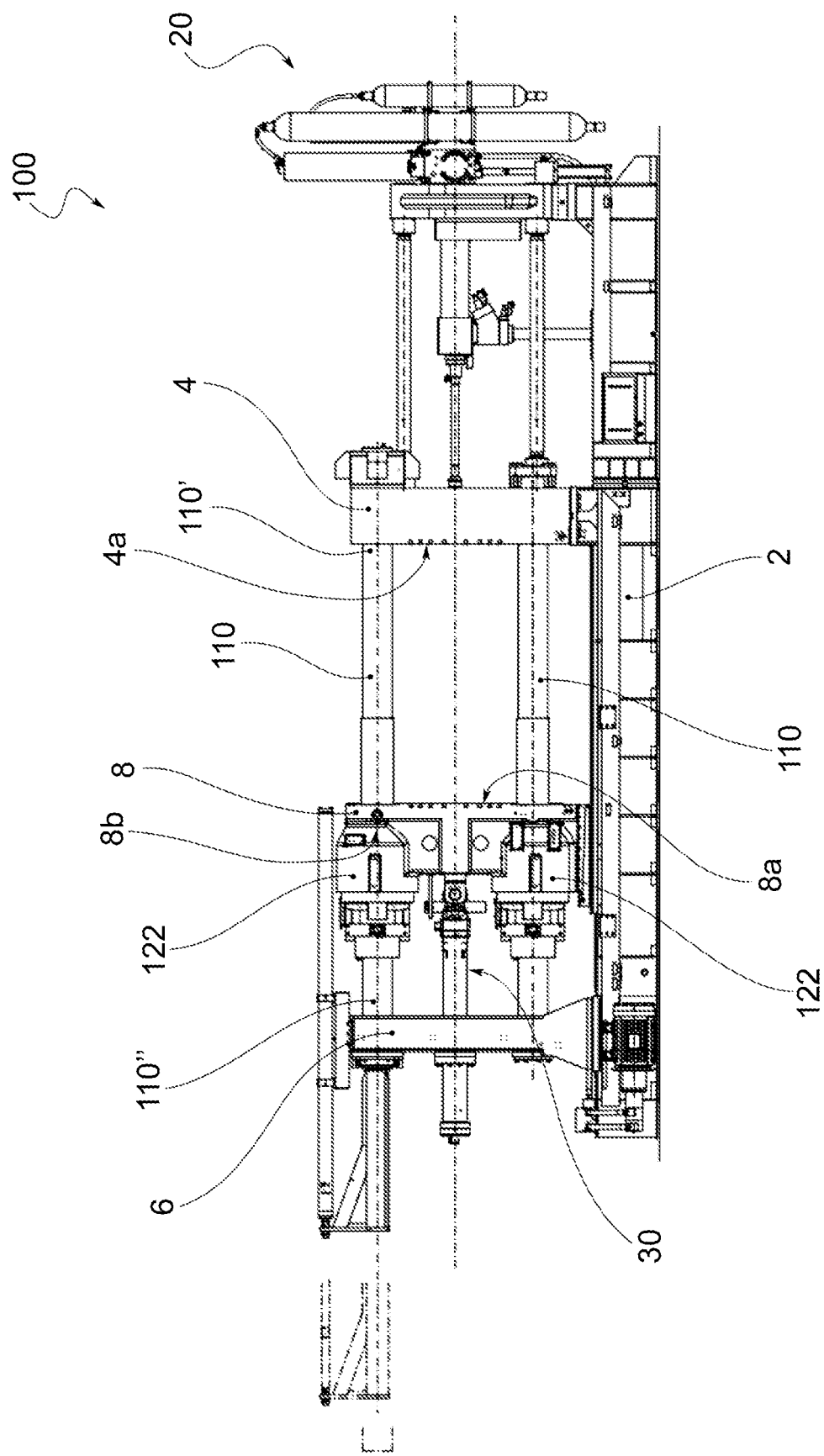
FIG. 7 shows a die-casting machine without toggle-joint, according to a further embodiment of the present invention.

According to a further aspect of the invention, with reference to FIG. 7, a die-casting machine without toggle-joint 100 has structural and functional features similar to those of the machine with toggle-joint described above, but comprises locking jaws 122 for locking the movable surface 8 in the engagement position with the first fixed surface 4, in which the mold is closed.

Preferably, the locking jaws 122 are supported by the movable surface 8, and in particular applied to an external face 8*b* of the movable surface 8; moreover, said locking jaws 122 are preferably operated by means of actuators, for example hydraulic ones.

In such embodiment (FIGS. 8 and 9), each horizontal column 110 extends longitudinally along a respective column axis X between a first end 110', fixed to the first fixed surface 4, and a second end 110", supported by the second fixed surface 6. At the first end 110', the horizontal column 110 has a threaded section 112, preferably made according to what is described above for the threaded section 12 of the horizontal columns 10.

Furthermore, each horizontal column 110 has, in an intermediate position between the first end 110' and the second end 110", a shaped section 114 on which the locking jaws 122 are forcibly tightened to close the mold by means of a radial locking.

Each shaped section 114 comprises a plurality of raised circumferential ribs 116 longitudinally spaced so as to form respective circumferential grooves 118.

According to the invention, the shaped section 114, i.e. the ribs 116 and the grooves 118, is obtained by means of a turning process which leads to the creation of a preliminary profile and a subsequent rolling process carried out on the preliminary profile, which leads to the creation of a final profile, as described above for the thread 14.

Similarly to what has been described above, this method of manufacturing the shaped section 114 allows particularly reliable horizontal columns to be obtained, since the bottom of the grooves has residual compression stress state due to rolling.

It is clear that those skilled in the art may make changes to the method described above in order to meet specific needs, all falling within the scope of protection defined in the following claims.

What is claimed is:

1. A method of manufacturing a horizontal column of a die-casting machine with a toggle-joint, the method comprising:
   providing a semi-finished cylinder;
   turning the semi-finished cylinder to create a preliminary profile, wherein the preliminary profile comprises:
   at least one portion of a thread of at least one threaded section, wherein the at least one portion of the thread of the at least one threaded section is configured to connect to a fixed surface of the die-casting machine, and
   a stock, wherein the stock has a thickness ranging between 0.5 and 4 millimeters, and
   rolling the turned semi-finished cylinder to generate the horizontal column, said rolling comprising modifying the preliminary profile into a final profile and hardening material of the turned semi-finished cylinder.

2. The method of claim 1, wherein the thread has a pitch greater than or equal to 14 millimeters.

3. The method of claim 1, wherein the rolling is carried out on sides and on grooves of the preliminary profile.

4. The method of claim 1, wherein the stock has a thickness ranging between 1.8 and 3.5 millimeters.

5. The method of claim 1, wherein the stock has a thickness ranging between 2 and 3 millimeters.

6. A die-casting machine with the toggle-joint comprising at least one horizontal column manufactured according to the method of claim 1.

7. The die-casting machine of claim 6, wherein the at least one horizontal column comprises a threaded section having a depth of thread greater than or equal to 6 millimeters, and wherein at least a bottom of grooves of the threaded section has a residual compression stress state.

* * * * *